Figure 1:
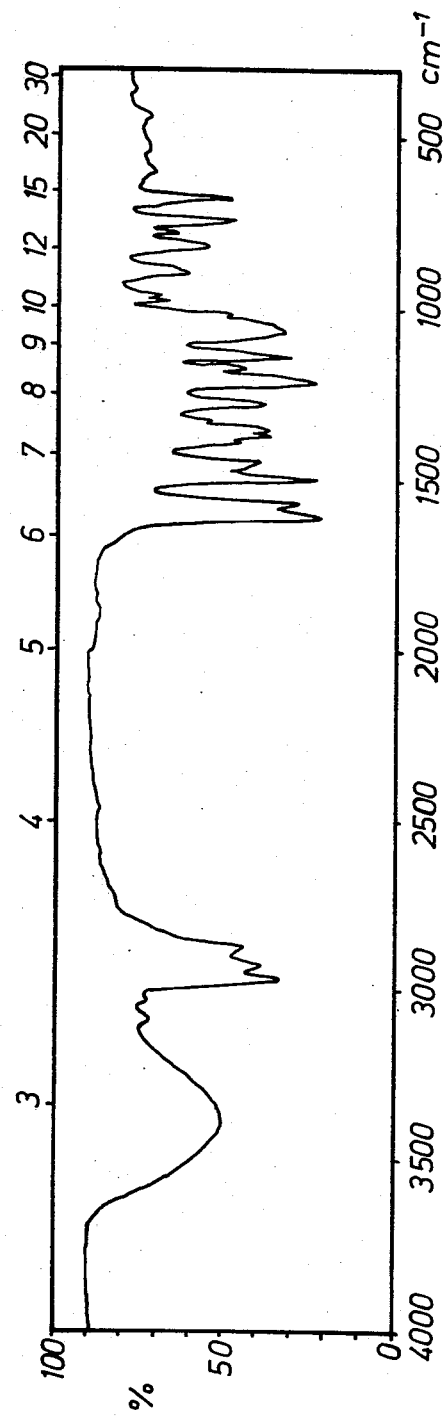

United States Patent [19]

Psaar

[11] 4,125,717
[45] Nov. 14, 1978

[54] PROCESS FOR THE PREPARATION OF OXAZINE DYESTUFFS

[75] Inventor: Hubertus Psaar, Leverkusen, Germany

[73] Assignee: Bayer Aktiengesellschaft, Leverkusen, Germany

[21] Appl. No.: 813,316

[22] Filed: Jul. 6, 1977

[30] Foreign Application Priority Data

Jul. 10, 1976 [DE] Fed. Rep. of Germany ....... 2631166

[51] Int. Cl.² .......................................... C07D 265/34
[52] U.S. Cl. ..................................... 544/102; 260/574
[58] Field of Search ............................... 544/102, 103

[56] References Cited

U.S. PATENT DOCUMENTS

| 3,629,248 | 12/1971 | Schafer et al. | 260/242 |
| 3,806,504 | 4/1974 | Mundlos et al. | 544/103 |
| 3,828,035 | 8/1974 | Baumann et al. | 544/103 |

Primary Examiner—John D. Randolph
Attorney, Agent, or Firm—Plumley and Tyner

[57] ABSTRACT

Process for the preparation of basic oxazine dyestuffs by nitrosation of aminophenol ethers

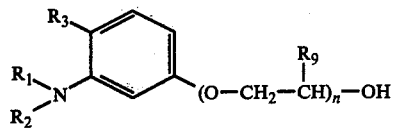

wherein
$R_1$ denotes hydrogen or optionally substituted alkyl or alkenyl,
$R_2$ denotes optionally substituted alkyl, alkenyl, aryl or aralkyl,
$R_3$ denotes hydrogen, alkyl or alkoxy,
$R_9$ denotes hydrogen or alkyl and
$n$ denotes 1, 2 or 2, and condensation with phenols

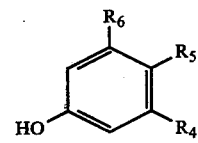

wherein
$R_4$ denotes hydrogen or the group

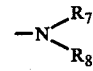

$R_5$ denotes hydrogen, alkyl or alkoxy,
$R_6$ denotes hydrogen or, conjointly with $R_5$, denotes an aromatic radical,
$R_7$ denotes hydrogen or optionally substituted alkyl or alkenyl, and
$R_8$ denotes hydrogen or optionally substituted alkyl, alkenyl, aryl or aralkyl.

1 Claim, 2 Drawing Figures

PROCESS FOR THE PREPARATION OF OXAZINE DYESTUFFS

The subject of the invention is a process for the preparation of basic oxazine dyestuffs by a condensation reaction of 4-nitroso-3-(β-hydroxy-alkoxy)-arylamines with phenols.

The process according to the invention has proved particularly suitable for the preparation of oxazine dyestuffs of the formula

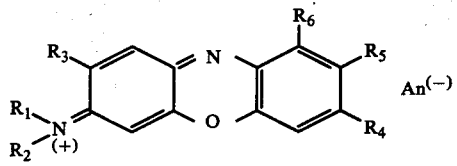

wherein
$R_1$ denotes hydrogen or optionally substituted alkyl or alkenyl,
$R_2$ denotes optionally substituted alkyl, alkenyl, aryl or aralkyl,
$R_3$ denotes hydrogen, alkyl or alkoxy,
$R_4$ denotes hydrogen or the group

$R_5$ denotes hydrogen, alkyl or alkoxy,
$R_6$ denotes hydrogen or, conjointly with $R_5$, denotes an aromatic radical,
$R_7$ denotes hydrogen or optionally substituted alkyl or alkenyl,
$R_8$ denotes hydrogen or optionally substituted alkyl, alkenyl, aryl or aralkyl and
$An^{(-)}$ denotes an anion,
by nitrosation of aminophenol ethers of the formula

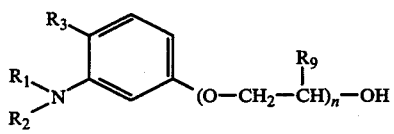

wherein
$R_1$, $R_2$ and $R_3$ have the abovementioned meaning and
$R_9$ denotes hydrogen or alkyl and
$n$ denotes 1, 2 or 3,
in the presence of an acid which supplies the anion $An^{(-)}$ and subsequent reaction of the product with compounds of the formula

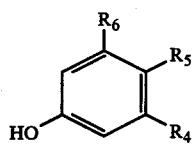

wherein
$R_4$, $R_5$ and $R_6$ have the abovementioned meaning.

The alkyl groups have, in particular, 1-4 carbon atoms and the alkenyl groups have 2 or 3 carbon atoms. Suitable substituents of the alkyl groups are, for example, hydroxyl, $C_1-C_4$-alkoxy, cyano, $C_1-C_4$-alkoxycarbonyl or aminocarbonyl. Preferred alkoxy groups are $C_1-C_4$-alkoxy groups.

Aryl is understood as preferably phenyl and aralkyl as benzyl.

The benzene ring and the naphthalene ring may be mentioned above all as aromatic radicals which can be formed by $R_5$ and $R_6$ conjointly.

The phenyl groups and the benzene or naphthalene rings can, in turn, be substituted by non-ionic groups and/or carboxyl groups.

Non-ionic substituents in the sense of the invention are the non-dissociating substituents customary in dyestuff chemistry, such as halogen and alkyl, cycloalkyl, hydroxyl, alkoxy, aralkoxy, cycloalkoxy, aryloxy, acyloxy, acylalkoxycarbonyl, aminocarbonyl, nitrile, amino, alkylamino, dialkylamino, acylamino, aminosulphonyl, mercapto, alkylmercapto and arylmercapto groups.

The aromatic rings are preferably substituted by 1 or 2 halogen atoms or $C_1-C_4$-alkyl or $C_1-C_4$-alkoxy groups.

Possible anions are all the organic and inorganic anions customary for cationic dyestuffs. Colourless anions are preferred.

The anion is generally determined by the process of preparation and any purification of the dyestuffs which may be carried out. In general, the dyestuffs are in the form of halides and especially of chlorides. The anions can be replaced, in a known manner, by other anions, for example methosulphate, ethosulphate, sulphate, benzenesulphate or toluenesulphate or acetate.

The new process can be used in particular for the preparation of dyestuffs of the formula

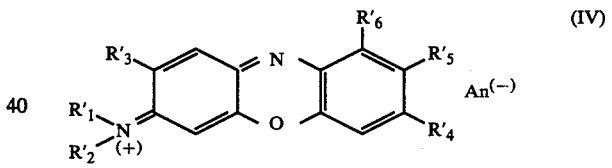

wherein
$R'_1$ denotes hydrogen, $C_1-C_4$-alkyl, $C_2$- or $C_3$-alkenyl, β-cyanoethyl, β-hydroxyethyl, β-hydroxypropyl, β-chloroethyl, β-$C_1-C_4$-alkoxyethyl, β-$C_1-C_4$-alkoxypropyl or β-carboxamidoethyl,
$R'_2$ denotes $C_1-C_4$-alkyl, $C_2$- or $C_3$-alkenyl, β-cyanoethyl, β-hydroxy-β-hydroxyethyl, β-hydroxypropyl, β-chloroethyl, β-$C_1-C_4$-alkoxyethyl, β-$C_1-C_4$-alkoxypropyl or β-carboxamidoethyl, or phenyl or benzyl which are optionally substituted by $C_1-C_4$-alkyl, halogen or $C_1-C_4$-alkoxy,
$R'_3$ denotes hydrogen, $C_1-C_4$-alkyl or $C_1-C_4$-alkoxy,
$R'_4$ denotes hydrogen or the group

$R'_5$ denotes hydrogen, $C_1-C_4$-alkyl or $C_1-C_4$-alkoxy,
$R'_6$ denotes hydrogen or, together with $R'_5$, denotes a benzene ring,
$R'_7$ denotes hydrogen, $C_1-C_4$-alkyl, $C_2$- or $C_3$-alkenyl, β-cyanoethyl, β-hydroxyethyl, β-hydroxypropyl, β-chloroethyl, β-$C_1-C_4$-alkoxyethyl, β-$C_1-C_4$-alkoxypropyl or β-carboxamidoethyl, R'₈ denotes hydrogen, C₁-C₄-alkyl, C₂- or C₃-alkenyl, β-cyanoethyl, β-hydroxyethyl, β-hydroxypropyl, β-chloroethyl, β-C₁-C₄-alkoxyethyl, β-C₁-C₄-alkoxypropyl or β-carboxamidoethyl, or phenyl or benzyl which are optionally substituted by C₁-C₄-alkyl, halogen or C₁-C₄-alkoxy and An$^{(-)}$ denotes an anion, from nitroso compounds of aminophenol ethers of the formula

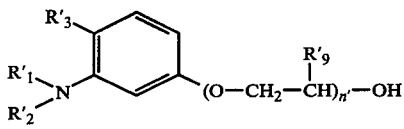
(V)

and compounds of the formula

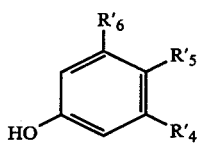
(VI)

In the formulae (V) and (VI), the radicals R'₁ to R'₆ have the abovementioned meaning and R'₉ represents hydrogen, methyl or ethyl and n' represents 1 or 2.

Amongst the dyestuffs of the formula (IV), those of the formula

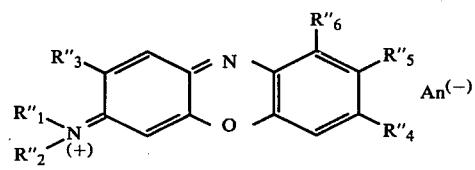
(VII)

wherein

R''₁ denotes hydrogen, methyl or ethyl,

R''₂ denotes methyl, ethyl, cyanoethyl or phenyl which is optionally substituted by methyl, chlorine or methoxy, R''₃ denotes hydrogen, methyl or methoxy, R''₄ denotes hydrogen or the group

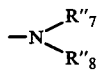

R''₅ denotes hydrogen, methyl or methoxy,

R''₆ denotes hydrogen,

R''₇ denotes hydrogen, methyl or ethyl and

R''₈ denotes hydrogen, methyl, ethyl, cyanoethyl or phenyl which is optionally substituted by methyl, chlorine or methoxy, and An$^{(-)}$ has the indicated meaning, can be prepared particularly advantageously.

Amino-ethers of the formula (II) have been described, for example, by D. R. Boyd and E. R. Marle in Journal of the Chemical Society 105 (1914), pages 2117–2139. They can be prepared by reacting aminophenols of the formula

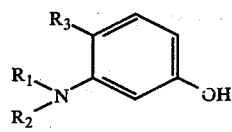
(VIII)

wherein

R₁, R₂ and R₃ have the abovementioned meaning, with epoxides.

The conversion of the aminophenols (VIII) is carried out in the presence of small amounts of an alkali at temperatures of 80°–120° C.

Suitable epoxides are, preferably, ethylene oxide, propylene oxide and butylene oxide. The resulting reaction mixture can be further processed either direct or after purification.

The nitrosation of the aminophenol ethers (II) is carried out in an aqueous acid solution, for example in hydrochloric acid, with sodium nitrite. The resulting nitroso compounds possess an excellent solubility in water. They do not need to be isolated from the reaction medium prior to the condensation reaction with the compounds (VI). The compounds (VI) are employed in the condensation reaction in alcoholic, for example methanolic, solution. The condensation reaction is preferably carried out at temperatures of 60°–80° C.

The dyestuffs of the formula (I) can be isolated from the reaction medium by known processes, for example by precipitation with zinc chloride or, after removal of the solvent, by precipitation with urea, in accordance with the process of German Offenlegungsschrift (German Published Specification) No. 2,353,987.

Figure 2:
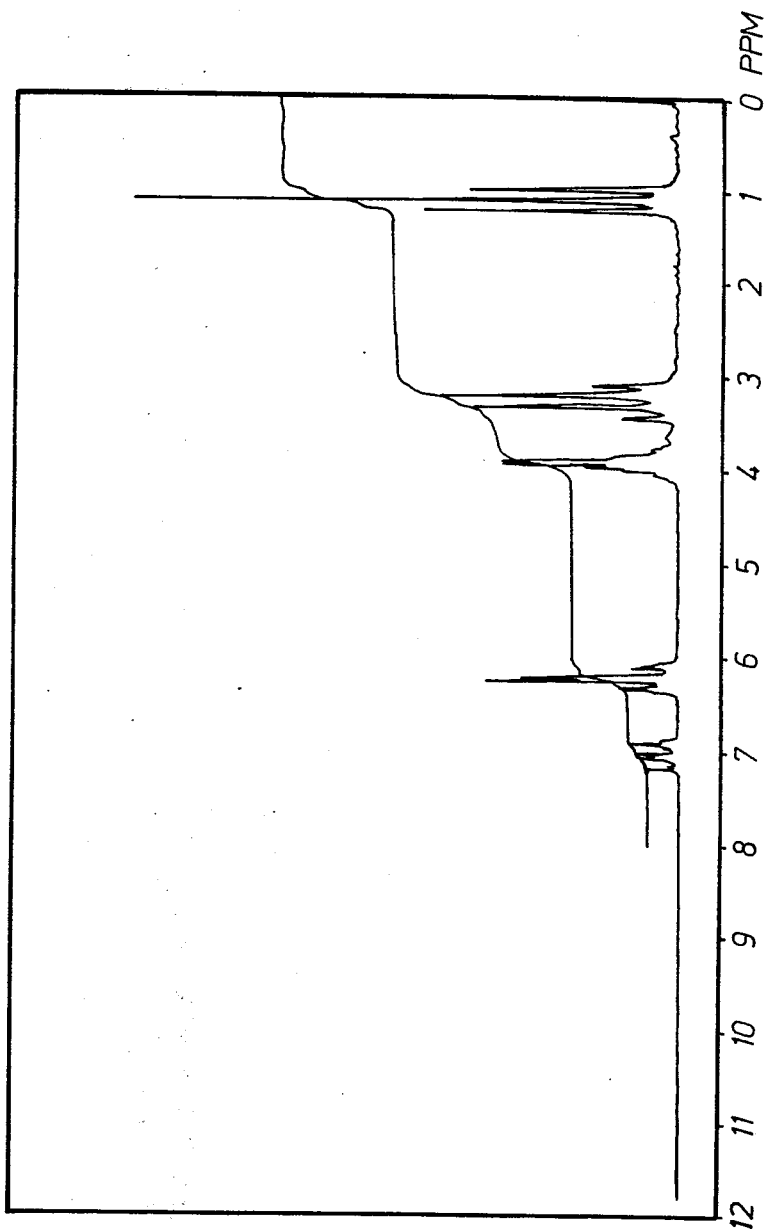

FIG. 1 shows the IR spectrum of the compound of Example 1 while FIG. 2 shows the NMR spectrum of the compound of this example.

EXAMPLE 1

165 Parts by weight of 3-diethylaminophenol and 2 parts by weight of triethanolamine are warmed to 90° C. under nitrogen. 55 parts by weight of ethylene oxide are then introduced in the course of 1 hour, whilst stirring. The mixture is stirred for a further 2 hours at 90° C. and cooled to room temperature and the ethylene oxide is blown off with nitrogen.

243 Parts by weight of a reaction product which contains 86% of 3-diethylamino-phenyl β-hydroxyethyl ether are obtained. The ether can be employed without further purification for synthesis of the dyestuff, in accordance with Example 8.

The purification and isolation of the ether is effected by distillation. It has a boiling point of 186°–189° C./13 mm. It was identified by the IR and NMR spectra.

If 65 parts by weight of propylene oxide are used in place of ethylene oxide, 3-diethylamino-phenyl β-hydroxypropyl ether is obtained.

The aminophenol ethers listed in Table 1 were prepared in the same way.

Table 1

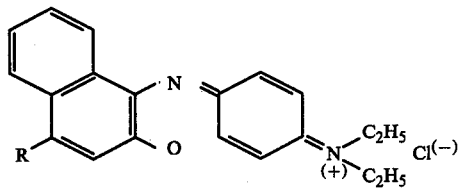

| Example | $R_1$ | $R_2$ | $R_3$ | $R_9$ |
|---|---|---|---|---|
| 2 | $CH_3$ | $CH_3$ | $CH_3$ | $CH_3$ |
| 3 | $CH_3$ | $CH_3$ | H | H |
| 4 | $C_2H_5$ | H | $CH_3$ | $CH_3$ |
| 5 | $CH_3$ | $C_2H_4CN$ | H | $CH_3$ |
| 6 | H | $C_2H_4CN$ | $OCH_3$ | $CH_3$ |
| 7 | $C_6H_5OCH_3$ | H | H | H |

EXAMPLE 8

488 Parts by weight of sodium nitrite, dissolved in 735 parts by weight of water, are allowed to run into a solution of 191 parts by weight of 3-diethylaminophenyl β-hydroxypropyl ether (70%), 188 parts by weight of hydrochloric acid (30%) and 145 parts by weight of water at 0°–5° C. After the mixture has been stirred for 1 hour, the aqueous solution of the nitroso compound is allowed to run slowly into a solution of 99 parts by weight of 3-diethylaminophenol in 475 parts by weight of methanol at 70°–75° C. After the reaction has ended, the mixture is cooled to 50° C. and the dyestuff is precipitated with 50 parts by weight of zinc chloride. The dyestuff is filtered off at 20° C. in the form of the zinc chloride double salt and is rinsed with methanol.

In a modified form, the dyestuff can also be isolated with urea by distilling off the methanol and water in vacuo after the reaction has ended, adding 600 parts by weight of anhydrous alcohol, 180 parts by weight of urea and 18 parts by weight of hydrochloric acid, cooling the mixture to 0° C. and filtering off the dyestuff in the form of the urea adduct.

The dyestuffs listed in the table which follows were prepared by the same procedure:

Table 2

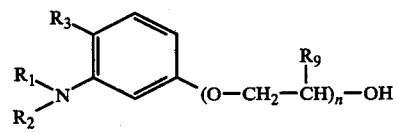

| Example | $R_1$ | $R_2$ | $R_3$ | $R_5$ | $R_6$ | $R_7$ |
|---|---|---|---|---|---|---|
| 9 | $CH_3$ | $CH_3$ | H | $CH_3$ | $CH_3$ | H |
| 10 | $C_2H_5$ | $C_2H_5$ | H | H | $C_2H_5$ | $CH_3$ |
| 11 | " | " | H | H | $C_2H_4CN$ | $CH_3$ |
| 12 | " | " | H | H | " | $OCH_3$ |
| 13 | " | " | H | $CH_3$ | " | H |
| 14 | " | " | H | " | $CH_3$ | $CH_3$ |
| 15 | " | " | H | H | $C_6H_5$ | H |
| 16 | $CH_3$ | $CH_3$ | $CH_3$ | $C_2H_5$ | $C_2H_4CN$ | H |
| 17 | $C_2H_5$ | H | " | $CH_3$ | $CH_3$ | $CH_3$ |
| 18 | " | H | " | H | H | $OCH_3$ |
| 19 | $C_6H_5OCH_3$ | H | H | H | $C_2H_4CN$ | $CH_3$ |
| 20 | $C_6H_5$ | H | H | $CH_3$ | H | $C_2H_5$ | $CH_3$ |

Table 3

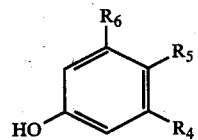

| Example | R |
|---|---|
| 21 | H |
| 22 | $NH_2$ |
| 23 | $N(C_2H_5)_2$ |

I claim:
1. Process for the preparation of basic oxazine dyestuffs which comprises nitrosating in aqueous solutions aminophenol ethers of the formula

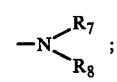

wherein
$R_1$ is hydrogen, $C_1$–$C_4$-alkyl, $C_2$–$C_3$-alkenyl, β-cyanoethyl, β-hydroxyethyl, β-hydroxypropyl, β-chloroethyl, β-$C_1$–$C_4$-alkoxyethyl, β-$C_1$–$C_4$-alkoxypropyl, or β-carboxamidoethyl;
$R_2$ is $C_1$–$C_4$-alkyl, $C_2$–$C_3$-alkenyl, β-cyanoethyl, β-hydroxyethyl, β-hydroxypropyl, β-chloroethyl, β-$C_1$–$C_4$-alkoxyethyl, β-$C_1$–$C_4$-alkoxypropyl, β-carboxamidoethyl, phenyl, benzyl, $C_1$–$C_4$-alkylphenyl, $C_1$–$C_4$-alkylbenzyl, halophenyl, halobenzyl, $C_1$–$C_4$-alkoxyphenyl, or $C_1$–$C_4$-alkoxybenzyl;
$R_3$ is hydrogen, $C_1$–$C_4$-alkyl, or $C_1$–$C_4$-alkoxy;
$R_9$ is hydrogen, methyl, or ethyl; and
n is 1 or 2;
and subjecting the nitrosated reaction products without isolation from the reaction medium to a condensation reaction with phenols of the formula wherein
$R_4$ is hydrogen or $$-N\begin{matrix}R_7\\R_8\end{matrix} \; ;$$

$R_5$ is hydrogen, $C_1$–$C_4$-alkyl, or $C_1$–$C_4$-alkoxy;
$R_6$ is hydrogen or, when joined together with $R_5$ is the remaining portion of a benzene ring;
$R_7$ is hydrogen, $C_1$–$C_4$-alkyl, $C_2$–$C_3$-alkenyl, β-cyanoethyl, β-hydroxyethyl, β-hydroxypropyl, β-chloroethyl, β-$C_1$–$C_4$-alkoxyethyl, β-$C_1$–$C_4$-alkoxypropyl, or β-carboxamidoethyl; and
$R_8$ is hydrogen, $C_1$–$C_4$-alkyl, $C_2$–$C_3$-alkenyl, β-cyanoethyl, β-hydroxyethyl, β-hydroxypropyl, β-chloroethyl, β-$C_1$–$C_4$-alkoxyethyl, β-$C_1$–$C_4$-alkoxypropyl, β-carboxamidoethyl, phenyl, benzyl, $C_1$–$C_4$-alkylphenyl, $C_1$–$C_4$-alkylbenzyl, halophenyl, halobenzyl, $C_1$–$C_4$-alkoxyphenyl, or $C_1$–$C_4$-alkoxybenzyl.

* * * * *